United States Patent [19]

Wesemeyer et al.

[11] 4,380,225
[45] Apr. 19, 1983

[54] VEHICLE ENGINE IGNITION SYSTEM UTILIZING LIGHT GUIDES FOR PROTECTION AGAINST INTERFERENCE

[75] Inventors: Jurgen Wesemeyer, Nuremberg; Georg Haubner, Berg; Werner Meier, Rednitzhembach, all of Fed. Rep. of Germany

[73] Assignee: Robert Bosch GmbH, Stuttgart, Fed. Rep. of Germany

[21] Appl. No.: 235,566

[22] Filed: Feb. 18, 1981

[30] Foreign Application Priority Data

Mar. 3, 1980 [DE] Fed. Rep. of Germany ....... 3008066

[51] Int. Cl.$^3$ .......................... F02P 1/00; F02P 1/00; F02P 5/04; F02P 5/06
[52] U.S. Cl. ...................................... 123/613; 123/633
[58] Field of Search ................................ 123/613, 633

[56] References Cited

U.S. PATENT DOCUMENTS

| | | | |
|---|---|---|---|
| 4,007,724 | 2/1977 | Mura | 123/633 |
| 4,092,968 | 6/1978 | Stover et al. | 123/613 |
| 4,106,461 | 8/1978 | Gianinni | 123/613 |
| 4,106,462 | 8/1978 | Hildebrandt et al. | 123/613 |
| 4,116,174 | 9/1978 | Schlicting | 123/613 |

FOREIGN PATENT DOCUMENTS

| | | | |
|---|---|---|---|
| 139441 | 1/1980 | Fed. Rep. of Germany | 123/613 |
| 594437 | 11/1947 | United Kingdom | 123/633 |

*Primary Examiner*—Raymond A. Nelli
*Attorney, Agent, or Firm*—Frishauf, Holtz, Goodman & Woodward

[57] ABSTRACT

In order to mount the control circuit for the ignition system at a location remote from the spark plug and ignition coil, i.e. at a location not subject to electromagnetic or electrical interference, photoconductors are used to interconnect the control circuit with the final output stage. Photoconductors are also used to interconnect the basic synchronization unit, that is the unit which furnishes a pulse for each rotation of a shaft of the engine, to the input of the control circuit. A theft prevention device is also incorporated. Specifically, the control circuit compares a sequence stored in a microprocessor to the on/off pattern of a received light pulse sequence. The latter is applied from a light emitter through a convex lens and a photoconductor to a second input of the control unit. Only if the stored pattern corresponds to the received light pattern can control signals initiating a spark be generated.

8 Claims, 1 Drawing Figure

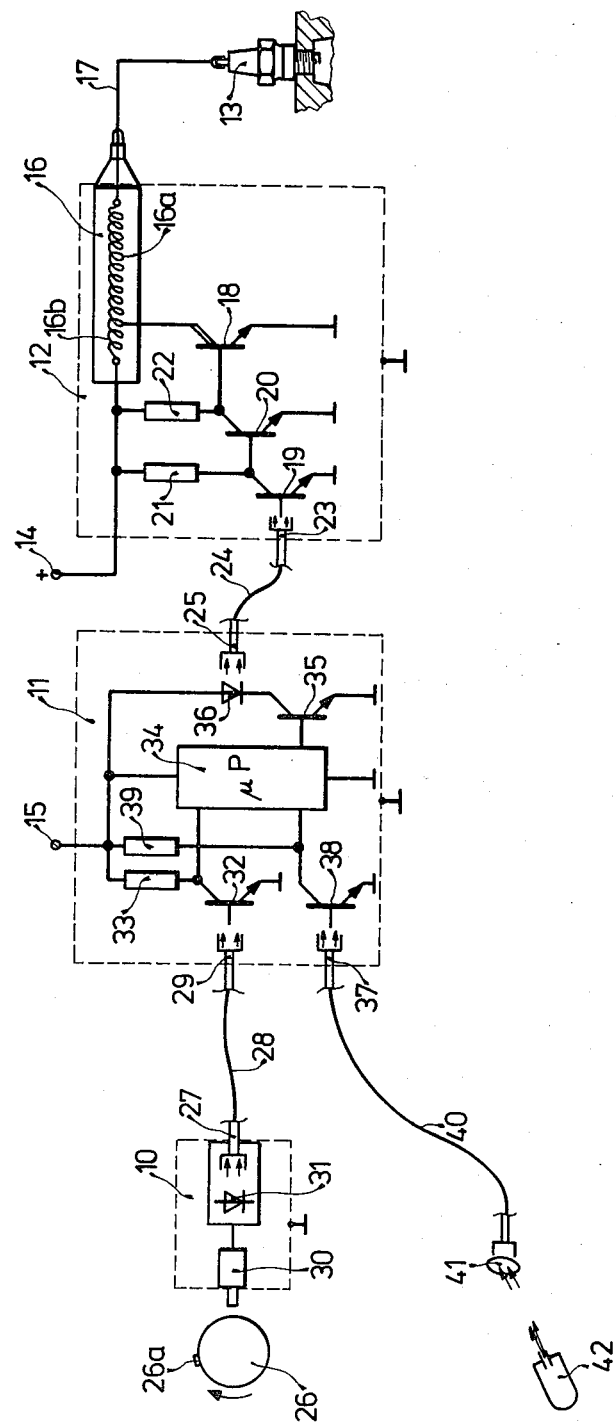

VEHICLE ENGINE IGNITION SYSTEM UTILIZING LIGHT GUIDES FOR PROTECTION AGAINST INTERFERENCE

The present invention relates to protection of ignition systems of internal combustion engines against electrical and magnetic interference.

BACKGROUND OF THE INVENTION

Ignition systems are well known in which the ignition coil, the distributor, the electronic switching circuit as well as the control circuit for timing the spark are electrically connected to each other and mounted in the engine compartment of the motor vehicle. The control circuit in particular is subjected to large temperature variations and shock and vibration, as well as electric and electromagnetic noise. In particular, when electronic apparatus is used to determine the ignition timing, such noise can have very deleterious effects. It is impossible to adequately shield the computing circuits against the electrical and electromagnetic interference which results from the sparks at the spark plugs.

THE INVENTION

It is an object of the present invention to provide a reliably operating ignition control system which utilizes sensitive components. The object of the present invention is accomplished by mounting the sensitive parts of the ignition system remote from the engine compartment and to connect the remotely located parts to the parts in the engine compartment by light guide "pipe" photoconductors. Such photoconductors can be included in the cable harness of the vehicle. Further, a theft prevention circuit is provided which receives a coded light pulse sequence from outside the vehicle through light guides. Operation of the ignition system is impeded until the correct light pulse sequence is received.

In the particularly preferred embodiment, a microprocessor is provided which stores the characteristic curve of ignition timing v. engine speed. The circuit according to the present invention operates satisfactorily even with such a relatively sensitive component.

BRIEF DESCRIPTION OF THE DRAWING

The single FIGURE is a circuit diagram, partially in block form, illustrating the present invention.

DESCRIPTION OF THE PREFERRED EMBODIMENT

The electronic ignition system for a single cylinder internal combustion engine is shown in the FIGURE. It includes a synchronization unit 10, a control unit 11, a power output stage 12 and a spark plug 12. Power output stage 12 is connected to the operating voltage of the vehicle at a terminal 14. Control unit 11 is connected to a constant DC voltage at a terminal 15 if no voltage stabilization is included in control unit 11. Power output stage 12 includes an ignition coil 16 whose secondary winding 16a is connected through an ignition cable 17 to spark plug 13. Primary winding 16b is connected to terminal 14 and, on the other hand, is connected through the emitter-collector circuit of ignition transistor 18 to reference or ground potential. Two pnp transistors 19 and 20 are connected to the input side of ignition transistor 18 as amplifier stages. Transistor 19 is a phototransistor whose emitter is connected to ground potential and whose collector is connected to the base of transistor 20 and, through a resistor 21, to terminal 14. The emitter of transistor 20 is connected to ground potential, while its collector is connected to the base of ignition transistor 18 and, via resistor 22, to terminal 14. Transistors 18, 19 and 20 together constitute a semiconductor switch having a control input 23. The latter is connected through a guiding photoconductor 24 with the output 25 of control unit 11. Control signals in the form of light pulse pass from control unit 11 to the control input 23 of the semiconductor switch via photoconductor 24. The semiconductor switch as well as the ignition coil 16 are embedded in a casting resin in a grounded housing.

Control unit 11 is installed in a location in the vehicle which is shielded against electromagnetic fields. For example, it may be installed behind a dashboard. Synchronization unit 10 cooperates with a rotating member 26 of the internal combustion engine. Output 27 of synchronization unit 10 is connected to input 29 of control unit 11 by a further photoconductor 28. For each rotation of the internal combustion engine, a synchronization signal in the form of a light pulse passes from synchronization unit 10 to control unit 11 through guiding photoconductor 28. The light pulse is generated by an electromagnetic sensor 30 which is electrically connected to a light emitting diode 31 positioned at output 27 of synchronization unit 10. A phototransistor 32 is positioned at input 29 of control unit 11. The phototransistor is positioned at the end of guiding photoconductor 28. Its emitter is connected to ground potential and its collector is connected through a resistor 33 to the stabilized voltage available at terminal 15. The collector of phototransistor 32 is also connected to the input of a microprocessor 34. Microprocessor 34 has a storage in which is stored at least one characteristic curve of ignition timing vs. speed. If the microprocessor is addressed by a speed dependent signal, the location addressed by this signal will contain a signal indicative of the desired ignition timing or advance. The output of microprocessor 34 is connected to the base of a pnp transistor 35. The emitter of transistor 35 is connected to ground potential while its collector is connected to a light emitting diode 36 whose anode is connected to terminal 15.

Control unit 11 has a further input 37 which is connected to a phototransistor 38. The emitter of phototransistor 38 is connected to ground potential while its collector is connected through a resistor 39 to terminal 15. The collector is also connected to a further input of microprocessor 34. Input 37 of control unit 11 is connected to a further photoconductor 40 whose other end is connected to a converging lens 41. Lens 41 is mounted in the vehicle so that it can be seen from the outside and thus can receive light signals which are emitted by an emitter 42. This allows the ignition system to be protected against theft. For this purpose, microprocessor 34 is coded to receive a predetermined sequence of pulses at the second input. This pulse sequence is coordinated with a light emitter 42 which is carried by the person authorized to use the vehicle. If emitter 42 is pointed toward lens 41 and activated, the coded sequence of light pulses passes over photoconductor 40 to phototransistor 38 and is there transduced into a corresponding coded sequence of electrical pulses. These pulses are applied to a second input of microprocessor 34 and are compared to a coded sequence stored in the latter. If there is agreement between the stored and the received sequence, the ignition system is activated. Since the synchronization unit 10, the control unit 11, the power output stage 12 and lens 24 are all mounted in different locations within the vehicle, the guiding photoconductors 24, 28 and 40 which connect these units are all included in the wiring harness of the vehicle.

OPERATION

When the ignition system is switched on while the vehicle is stationary, transistor 35 in control unit 11 is blocked. The light emitting diode 36 is therefore inactive and no light falls on phototransistor 19. Photo transistor 19 is blocked and therefore transistor 20 is fully conductive. When transistor 20 is conductive, the base-emitter circuit of ignition transistor 18 is shunted and therefore transistor 18 is blocked. When the internal combustion engine is operating, an electrical signal is generated in sensor 30 when a cam 26a of member 26 passes by. The electrical signal is converted into a light signal by light emitting diode 31. The light signal passes over photoconductor 28 to phototransistor 32 of control unit 11. Phototransistor 32 becomes conductive. This causes an electrical signal to be generated at its emitter terminal. The latter is applied as a synchronization signal to the input of microprocessor 34. The sequence of these synchronization signals allows the microprocessor to compute the speed of the internal combustion engine.

Transistor 35 is switched to the conductive state at a programmed time instant which depends upon the engine speed. This causes light emitting diode 36 to emit a light signal. The light signal passes over guiding photoconductor 24 to photo transistor 19 in power output stage 12. Phototransistor 19 becomes conductive. This causes transistor 20 to be blocked and ignition transistor 18 to become conductive via resistor 22. A current now flows in the primary circuit, i.e. through primary winding 16b and the emitter-collector circuit of ignition transistor 18. The current causes an electromagnetic field to be built up in ignition coil 16. The ignition timing is determined by microprocessor 34 on the basis of the above-mentioned ignition timing vs. engine speed curve which is stored in the microprocessor. At the suitable time instant, transistor 35 is again switched to the blocked stage. The light signal in photoconductor 24 is interrupted and phototransistor 19 is again blocked. This causes transistor 20 to become conductive and ignition transistor 18 to be blocked. The primary current is instantly interrupted, causing a high voltage pulse to be induced in seconary winding 16a of ignition pulse 16. The high voltage pulse causes a spark to be generated in spark plug 13. The process repeats with each full rotation of rotating member 26 of the internal combustion engine.

The present invention is not to be restricted to the illustrated embodiment. The same ignition system can be used for multi-cylinder internal combustion engines. In this case, a distributor is arranged between ignition coil 16 and spark plug 13. Rotating member 26 is also in the distributor in the multi-cylinder case and has a plurality of cams 26a. It is also possible to use the ignition system of the present invention for a magneto ignition system in which the armature constitutes both the ignition coil and the generator winding. In this case, sensor 30 of the synchronization unit may be dispensed with and light emitting diode 31 can be connected through a suitable matching circuit directly to the primary voltage generated by the magneto generator. The magneto generator and the power output stage can be integrated into one unit. It is also possible to use a Hall generator as sensor 30. The Hall generator has then to be connected to a current source as does light emitting diode 31. In the simplest case, the synchronization unit consists of a light barrier driven by the internal combustion engine. The light barrier passes through a gap in guiding photoconductor 28. A light emitting diode then has to be provided which steadily emits light to the guiding photoconductor which is positioned in front of the light barrier in the direction of light propogation.

Various changes and modifications may be made within the scope of the inventive concepts.

We claim:

1. In a motor vehicle ignition system having an ignition coil (16) an ignition system comprising:
    light responsive switch means (18, 19, 20) in the vicinity of said ignition coil connected to said ignition coil for interrupting flow therethrough in response to a light signal;
    control circuit means (11) in a vehicle location remote from said switch means for generating a light signal at desired ignition time instants;
    and light guiding photoconductor means (24) for leading light of said light signal generated in said control circuit means over a path provided by said photoconductor means to said light responsive switch means, whereby signal transmission from said control circuit means to said switch means is immune to electromagnetic and electrical interference active in the space between said control circuit means and the vicinity of said ignition coil.

2. An ignition system as set forth in claim 1, wherein said system serves an internal combustion engine having a rotating member (26); further comprising synchronization means (10) cooperating with said rotating member for furnishing a light signal constituting a synchronization signal when said rotating member is in a predetermined position relative to said synchronization means; and
    additional light guiding photoconductor means (28) for leading light of said light signal constituting said synchronization signal from said synchronization means over a path provided said photoconductor means to said control circuit means for synchronizing said control circuit means to said rotating member.

3. An ignition system as set forth in claim 2, wherein said control circuit means comprises a microprocessor (34) and wherein said microprocessor is mounted in a location remote from said switch means and shielded against electromagnetic noise and electrical interference.

4. An ignition system as set forth in claim 1, wherein said light guiding photoconductor means constitutes first light guiding photoconductor means connected to a first input of said control circuit means;
    wherein said control circuit means further comprises a second input and means connected to said second input for permitting said generation of said control signal only after receipt of a light signal constituting an enabling signal at said second input; and
    further comprising means (40–42) for applying said light signal constituting said enabling signal to said second input of said control circuit means.

5. An ignition system as set forth in claim 4, wherein said light applying means comprises means (42) for emitting a sequence of light pulses having a predetermined on/off pattern, and light guiding photoconductor means for connecting said light emitting means to said second input of said control circuit means; and wherein said control circuit means comprises means for storing a code sequence corresponding to said on/off pattern, comparing said code sequence to said on/off pattern, and enabling said generating of said light signal only upon coincidence of said on/off pattern and said code sequence.

6. An ignition system as set forth in claim 5, further comprising a lens (41) positioned close to said means for emitting said sequence of light pulses; and wherein said third light guiding photoconductor means interconnects said lens to said second input of said control circuit means.

7. An ignition system as set forth in claim 1, wherein said system is in a motor vehicle having a wire harness; and wherein said light guiding photoconductor means are included in said wire harness.

8. An ignition system as set forth in claim 2, wherein said additional light guiding photoconductor means has a gap along its length; and wherein said synchronization means comprises light blocking means carried by said rotating member; and wherein said rotating member is arranged relative to said gap in said light guiding photoconductor means so that said light blocking member blocks light transmitted across said gap when said rotating member is in said predetermined position relative to said synchronization means.

* * * * *